J. HULTZ.
Gun-Lock.
No. 270. Reissued July 4, 1854.
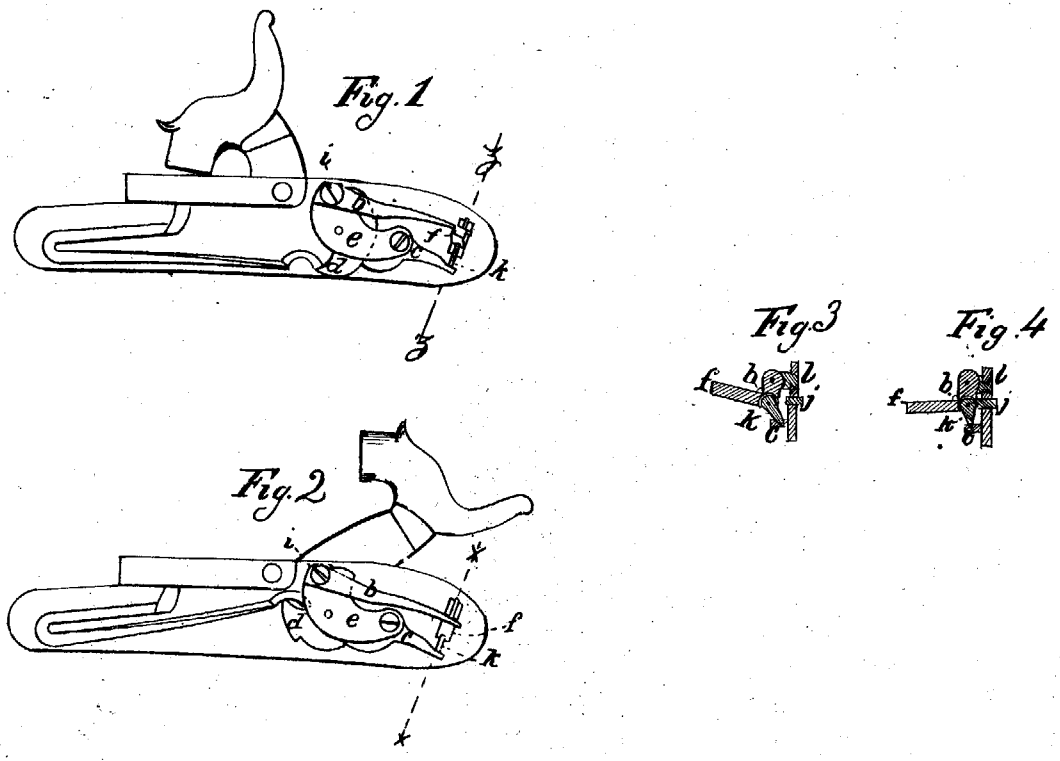
N. PETERS, PHOTO-LITHOGRAPHER, WASHINGTON, D. C.

UNITED STATES PATENT OFFICE.

JAMES HULTS, OF ALUM CREEK, OHIO.

IMPROVEMENT IN GUN-LOCKS.

Specification forming part of Letters Patent No. 10,927, dated May 16, 1854; Reissue No. 270, dated July 4, 1854.

*To all whom it may concern:*

Be it known that I, JAMES HULTS, of Berlin township, (Alum Creek Post-Office,) in the county of Delaware and State of Ohio, have invented a new and useful Improvement in Gun-Locks; and I do hereby declare that the following is a full and exact description thereof, reference being had to the accompanying drawings, making a part of this specification.

The nature of my invention consists in such a construction of a single-trigger gun-lock that it can be readily adjusted in such a manner that the cock can be detached from its cocked position by the slightest touch upon the trigger, or in such a manner that a smart pull upon the trigger will be required to detach the cock from its catch, and when adjusted in the former manner the cock will be held safely and securely until the trigger is touched, by which I am enabled to give to my improved lock all the advantages of the double-triggered lock and with less liability to accidents.

In the accompanying drawings, Figure 1 is a side view of my improved gun-lock with the cock thrown forward; Fig. 2, a side view representing the lock as fully cocked; Fig. 3, a section through the line *z z*, Fig. 1; and Fig. 4 is a section through the line *x x*, Fig. 2.

Similar letters indicate like parts in all the figures.

Instead of making an angular shoulder or notch in the tumbler *d* of my improved gun-lock for the reception of the point of the sear *c*, when the lock is cocked, and by means of which, by the ordinary arrangement, its elastic pressure against the tumbler is enabled to hold the cock in said position, I make a notch or shoulder on the tumbler of such a shape that it requires a rigid and positive action upon the sear to cause it to hold the cock in a cocked position. To produce this said rigid and positive action upon the sear I employ the jointed levers *k* and *f*, arranged within the lock and combined with the sear, as represented in the drawings.

*f* is an angular lever, and is jointed at the extremity of its short arm to the pin or projection *l* on the inner side of the plate of the lock and at its angle to the lever *k*. The lower extremity of the lever *k* fits into a recess in the upper side of the sear *c*, near its rear end. The short arm of the lever *f* is operated upon at a point near its junction with *k* by the lever *b*, which presses upon *f* with sufficient force to throw the lever *k* and the short arm of *f* into a straight position in line with each other at the moment that the cock is drawn back in a cocked position, which position of said levers will be attained by them at the moment that the point of the sear falls into the aforesaid retaining-notch of the tumbler. Consequently the short arm of *f* and the lever *k*, being in line with each other and at right angles to the rear portion of the sear, will hold the cock firmly and securely in its cocked position, and yet in such a manner that a slight touch of the trigger upon the under side of the outer extremity of the long arm of the lever *f* will detach the cock from its catch and allow it to spring forward by the action of the main-spring. A set-screw, *j*, is inserted through the plate of the lock for the union-joint of the levers *f* and *k* to strike against when they reach their proper position. By so adjusting the said set-screw as to allow the short arm of lever *f* and the lever *k* to pass to the rearward of a straight position with each other before they are arrested by the said screw, considerable more power will be required to throw forward the levers and detach the cock from their holding influence upon the sear and tumbler than when the said arm of *f* and the lever *k* are in a straight line with each other. It will therefore be perceived that the set-screw *j* can be so adjusted as to allow the cock to be detached from its catch when in a cocked position by a slight touch upon the trigger, or in such a manner as to require a smart pull upon the trigger to detach it. The set-screw *j* passes through the face-plate of the lock, as shown in Figs. 3 and 4, a sufficient distance to be readily accessible for adjustment at any moment.

The portion of the tumbler *d* upon which the point of the sear slides is made in the form of a segment that is concentric with its center of motion, for the purpose of preserving the sear in such a position, when the cock is thrown forward, as to sustain the levers *f* and *k* in the position shown in Fig. 3.

Having thus fully described my improvement in gun-locks, what I claim therein as new, and desire to secure by Letters Patent, is—

1. Giving such a shape to the tumbler or to the sear, or their equivalents, that the sear will not catch and safely hold back the cock in a cocked position, except when it is acted upon by a perfectly rigid force.

2. In connection with the said peculiar arrangement of the tumbler and the sear, the combination of the jointed levers *f* and *k* with the sear *c*, in such a manner that said levers will rigidly act upon the sear and cause it to safely hold the cock when it is thrown into a cocked position, substantially as herein set forth.

3. The set-screw *j*, arranged in such a manner in relation to the jointed levers *f* and *k*, the sear *c*, and the tumbler *d* that its adjustment to a greater or less extent will render it necessary to exert a greater or a less degree of power upon the trigger to detach the sear from its hold upon the tumbler when the cock is in a cocked position, substantially as herein set forth.

JAMES HULTS.

Witnesses:
Z. C. ROBBINS,
GEO. A. C. SMITH.